US012675075B2

(12) United States Patent
Hong et al.

(10) Patent No.: US 12,675,075 B2
(45) Date of Patent: Jul. 7, 2026

(54) SINGLE SLM-BASED BINOCULAR HOLOGRAPHIC NEAR-EYE DISPLAY AND CGH GENERATION METHOD FOR THE SAME

(71) Applicant: Korea Electronics Technology Institute, Seongnam-si (KR)

(72) Inventors: Ji Soo Hong, Seoul (KR); Byoung Hyo Lee, Seoul (KR); Sung Hee Hong, Seoul (KR); Young Min Kim, Seoul (KR); Jin Soo Jeong, Seoul (KR); Yong Hwa Kim, Seoul (KR); Hyeon Chan Oh, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 296 days.

(21) Appl. No.: 18/395,865

(22) Filed: Dec. 26, 2023

(65) Prior Publication Data

US 2025/0189928 A1 Jun. 12, 2025

(30) Foreign Application Priority Data

Dec. 11, 2023 (KR) ........................ 10-2023-0178615

(51) Int. Cl.
*G03H 1/28* (2006.01)
*G02B 25/00* (2006.01)
*G03H 1/00* (2006.01)

(52) U.S. Cl.
CPC ............. *G03H 1/28* (2013.01); *G02B 25/001* (2013.01); *G03H 1/0005* (2013.01); *G03H 2223/24* (2013.01)

(58) Field of Classification Search
CPC .... G03H 1/28; G03H 1/0005; G03H 2223/24; G03H 1/2294; G03H 2001/2284;
(Continued)

(56) References Cited

U.S. PATENT DOCUMENTS

2013/0135722 A1* 5/2013 Yokoyama ......... G02B 27/0172
359/489.08
2021/0072701 A1* 3/2021 Lee .................... G02B 27/0101
(Continued)

FOREIGN PATENT DOCUMENTS

JP 2013-15695 A 1/2013
KR 10-2021-0030072 A 3/2021

OTHER PUBLICATIONS

Korean Office Action issued on Nov. 29, 2024 in corresponding Korean Patent Application No. 10-2023-0178615 (3 pages in English and 5 pages in Korean).

*Primary Examiner* — Thomas K Pham
*Assistant Examiner* — Jennifer A Jones
(74) *Attorney, Agent, or Firm* — NSIP Law

(57) ABSTRACT

There are provided a single SLM-based binocular holographic near-eye display and a CGH generation method for the same. According to an embodiment, a holographic near-eye display represents a left-eye hologram image and a right-eye hologram image within a single hologram with different depths, and reconstructs an image by optically separating the left-eye hologram image and the right-eye hologram image. Accordingly, a binocular holographic near-eye display may be implemented with a low-cost/low-form factor without loss of a resolution, an angle of field, a depth representing capability, an eyebox, a frame rate even when the display is implemented by a single SLM.

17 Claims, 7 Drawing Sheets

(58) Field of Classification Search
CPC .... G03H 2225/60; G03H 1/0443; G03H 1/26;
G02B 25/001; G02B 27/017; G02B
2027/0185; G02B 2027/0174
See application file for complete search history.

(56)                              References Cited

U.S. PATENT DOCUMENTS

2022/0150466 A1*    5/2022    Oonishi ............. G02B 27/0101
2022/0171190 A1*    6/2022    Trisnadi .............. G02B 27/283

* cited by examiner

SINGLE SLM-BASED BINOCULAR HOLOGRAPHIC NEAR-EYE DISPLAY AND CGH GENERATION METHOD FOR THE SAME

CROSS-REFERENCE TO RELATED APPLICATION(S) AND CLAIM OF PRIORITY

This application is based on and claims priority under 35 U.S.C. § 119 to Korean Patent Application No. 10-2023-0178615, filed on Dec. 11, 2023, in the Korean Intellectual Property Office, the disclosure of which is herein incorporated by reference in its entirety.

BACKGROUND

Field

The disclosure relates to a binocular holographic near-eye display, and more particularly, to a near-eye display for representing a binocular hologram based on a single spatial light modulator (SLM), and a computer-generated hologram (CGH) generation method for the same.

Description of Related Art

As shown in FIGS. 1 and 2, a related-art near-eye head mounted display (HMD) for virtual reality (VR)/augmented reality (AR) uses an optical system in which SLMs and laser sources are coupled for respective eyeballs in order to provide binocular images to both eyes. Since an independent system is established for each eyeball, there may be a problem of a double system configuration cost, a double hardware weight, and a double form factor.

To solve this problem, a technology for implementing a binocular display device by using a single SLM in a holographic near-eye display has appeared. However, in this technology, 1) a resolution of a single SLM is divided in half and used, 2) a bandwidth of a spatial frequency domain of a SLM is divided in half and used, and 3) a framerate of a SLM is divided in half and used.

However, 1) when half of the resolution of the SLM is used, an image resolution and an angle of field are lost by half. 2) When half of the bandwidth of the spatial frequency is used, a 3D depth representing capability and a size of an eyebox are lost by half. 3) When the framerate is divided, the framerate is lost as much as it is divided and it is difficult to replay a video.

SUMMARY

The disclosure has been developed in order to solve the above-described problems, and an object of the disclosure is to provide, as a solution for implementing a binocular holographic near-eye display with a low-cost/low-form factor without loss of a resolution, an angle of field, a depth representing capability, an eyebox, a frame rate even when the display is implemented by a single SLM, a method for representing a left-eye hologram image and a right-eye hologram image within a single hologram with different depths, and reconstructing an image by optically separating the left-eye hologram image and the right-eye hologram image.

According to an embodiment of the disclosure to achieve the above-described object, a near-eye display may include: a light source configured to emit light to a modulator; a modulator configured to modulate light emitted from the light source and to reconstruct a hologram including a first hologram image and a second hologram image; a splitter configured to split the hologram reconstructed in the modulator and to distribute the hologram to a plurality of paths; a first eyepiece lens configured to focus only the first hologram image of the split hologram on a first eyeball of a user; and a second eyepiece lens configured to focus only the second hologram image of the split hologram on a second eyeball of the user.

The first hologram image may be formed on a zone that is out of an imaging zone formed by a focal distance of the second eyepiece lens as a virtual image, and the second hologram image may be formed on a zone that is out of an imaging zone formed by a focal distance of the first eyepiece lens as a virtual image.

The first hologram image and the second hologram image may be represented by hologram images having different depths in the hologram.

A depth difference between the first hologram image and the second hologram image may be a length difference between a light path from the modulator to the first eyepiece lens and a light path from the modulator to the second eyepiece lens.

The splitter may distribute a part of the hologram to the first eyepiece lens, and may distribute the other part to the second eyepiece lens.

According to the disclosure, the near-eye display may further include a mirror configured to reflect the other hologram split by the splitter to allow the other hologram to enter the second eyepiece lens.

A depth difference between the first hologram image and the second hologram image may be a distance from the splitter to the mirror.

A quantity of light of a part of the hologram image may be the same as a quantity of light of the other part of the hologram image.

The first hologram image may be one of a left-eye image and a right-eye image, and the second hologram image may be the other image of the left-eye image and the right-eye image.

According to another aspect of the disclosure, there is provided a near-eye display method including: a step of emitting, by a light source, light; a step of modulating, by a modulator, emitted light and reconstructing a hologram including a first hologram image and a second hologram image; a step of splitting, by a splitter, the reconstructed hologram, and distributing the hologram to a plurality of paths; a step of focusing, by a first eyepiece lens, only the first hologram image of the split hologram on a first eyeball of a user; and a step of focusing, by a second eyepiece lens, only the second hologram image of the split hologram on a second eyeball of the user.

According to still another aspect of the disclosure, there is provided a near-eye display including: a light source configured to emit light to a modulator; a modulator configured to reconstruct a hologram in which a first hologram image and a second hologram image are represented with different depths; a splitter configured to split the hologram reconstructed in the modulator and to distribute the hologram to a plurality of paths; a first eyepiece lens configured to focus only the first hologram image of the split hologram on a first eyeball of a user; and a second eyepiece lens configured to focus only the second hologram image of the split hologram on a second eyeball of the user.

According to yet another aspect of the disclosure, there is provided a near-eye display method including: a step of generating, by a hologram generation system, a hologram including a first hologram image and a second hologram image; a step of emitting, by a light source, light; a step of reconstructing, by a modulator, the hologram generated at the step of generating by modulating the emitted light; a step of splitting, by a splitter, the reconstructed hologram and distributing the hologram to a plurality of paths; a step of focusing, by a first eyepiece lens, only the first hologram image of the split hologram on a first eyeball of a user; and a step of focusing, by a second eyepiece lens, only the second hologram image of the split hologram on a second eyeball of the user.

As described above, according to embodiments of the disclosure, a binocular holographic near-eye display may be implemented with a low-cost/low-form factor without loss of a resolution, an angle of field, a depth representing capability, an eyebox, a frame rate even when the display is implemented by a single SLM, by representing a left-eye hologram image and a right-eye hologram image within a single hologram with different depths, and reconstructing an image by optically separating the left-eye hologram image and the right-eye hologram image.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide a single SLM-based binocular holographic near-eye display and a CGH generation method for the same.

The disclosure relates to a technology for reducing problems of a cost and a form factor by using a single SLM and a single laser source to provide a binocular image, and preventing performance degradation by not using any one of a resolution, a spatial frequency bandwidth, a framerate of a SLM in half.

Figure 1:
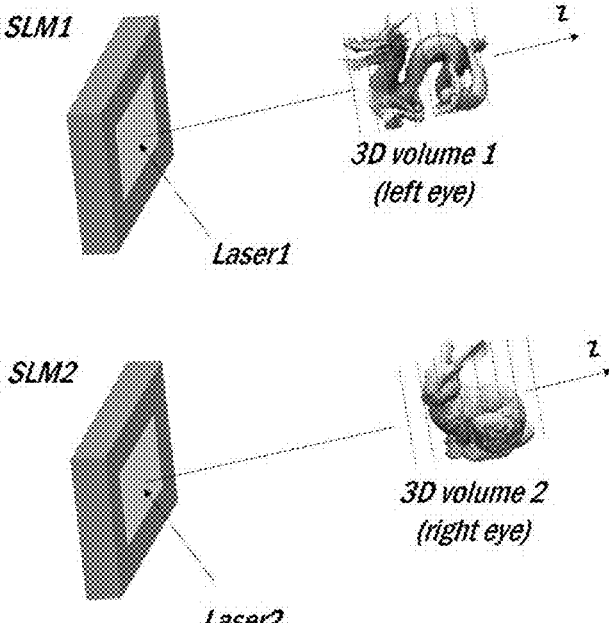
FIG. 1 is a view illustrating a related-art binocular holographic near-eye display in which SLMs and laser sources are coupled for respective eyeballs.
Figure 2:
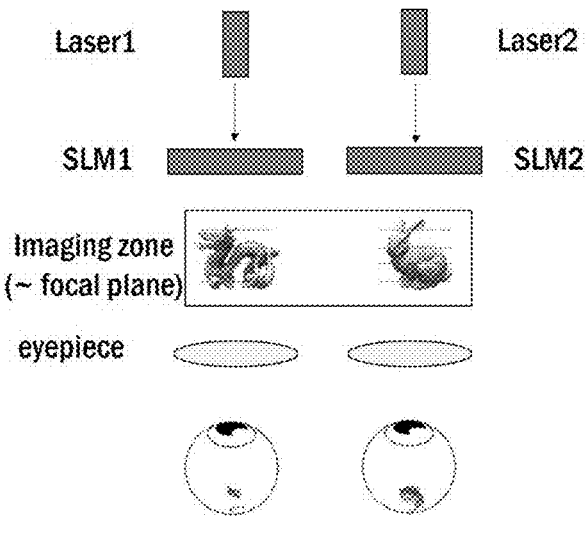
FIG. 2 is a view illustrating a related-art binocular holographic near-eye display in which SLMs and laser sources are coupled for respective eyeballs.
Figure 3:
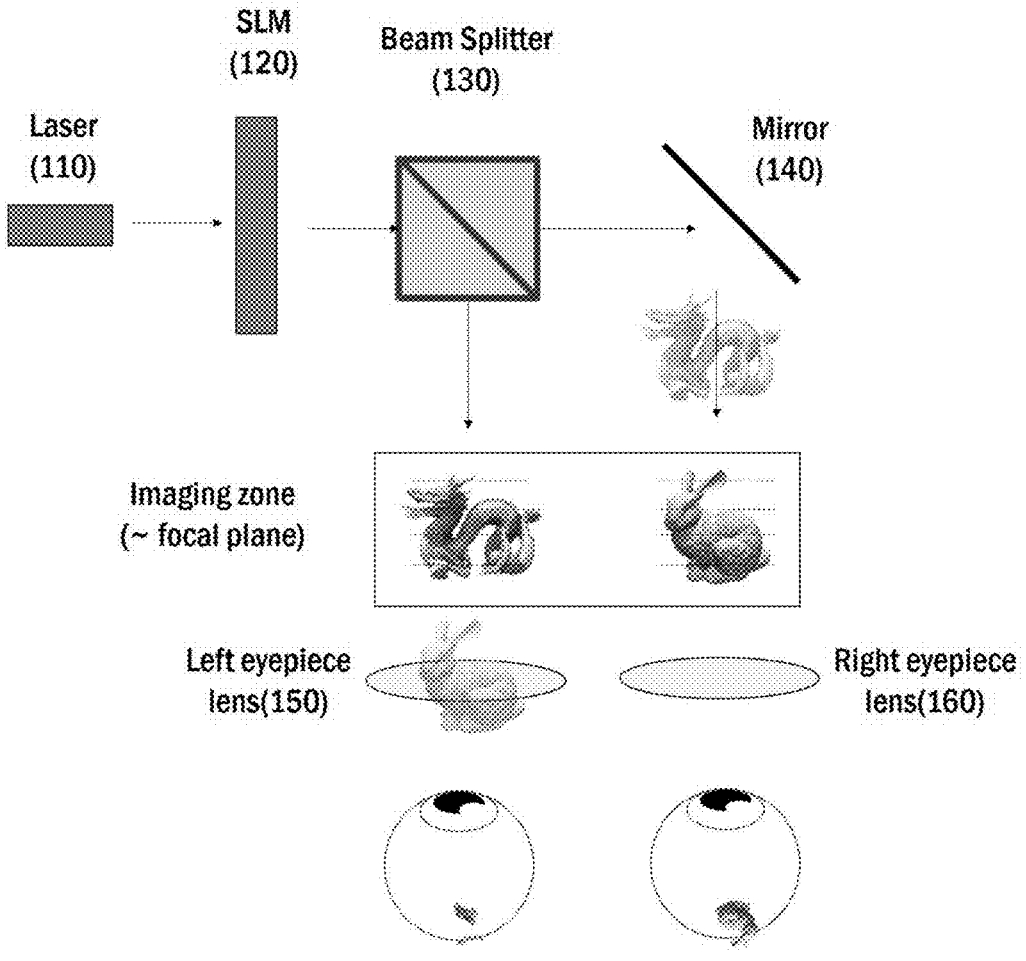
FIG. 3 is a view illustrating a structure of a single SLM-based binocular holographic near-eye display according to an embodiment of the disclosure.

FIG. 3 is a view illustrating a structure of a single SLM-based binocular holographic near-eye display according to an embodiment of the disclosure.

As shown in FIG. 3, the binocular holographic near-eye display according to an embodiment may include a laser source 110, a SLM 120, a beam splitter 130, a mirror 140, a left eyepiece lens 150, and a right eyepiece lens 160.

Figure 4:
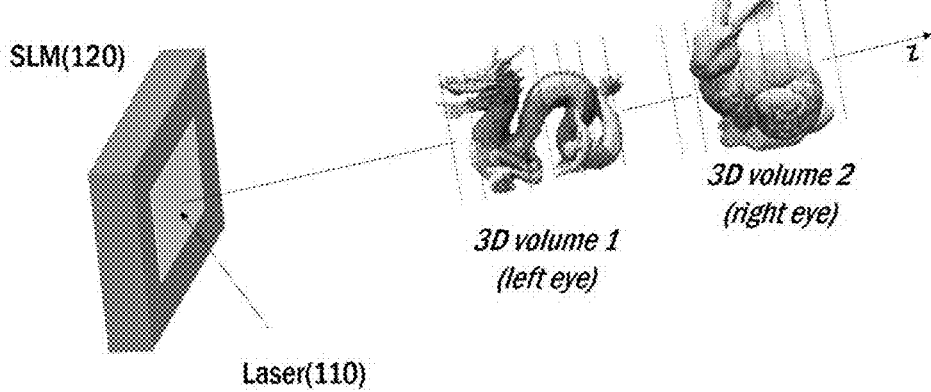
FIG. 4 is a view illustrating a hologram configuration in which a left-eye hologram image and a right-eye hologram image are represented with different depths.

The laser source 110 emits light to the SLM 120, and the SLM 120 is a light modulator that reconstructs a hologram by spatially modulating light entering from the laser source 110. A hologram reconstructed by the SLM 120 may have a left-eye hologram image (3D volume 1) and a right-eye hologram image (3D volume 2) which are represented with different depths as shown in FIG. 4.

The beam splitter 130 may split the hologram reconstructed by the SLM 120 and may distribute to a plurality of paths. Specifically, the beam splitter 130 distributes a part of the hologram to the left eyepiece lens 150, and distributes the other part of the hologram to the mirror 140. In this case, the beam splitter 130 may split the hologram in half, that is, may split the hologram fifty-fifty (50%) such that an amount of light of a part of the hologram is the same as an amount of the other part of the hologram.

The mirror 140 reflects the hologram split by the beam splitter 130 and entering to let the hologram enter the right eyepiece lens 160.

In the hologram distributed to the left eyepiece lens 150 from the beam splitter 130, the left-eye hologram image is formed on a focal distance area of the left eyepiece lens 150, that is, an imaging zone that is observable by a user, as a virtual image, but the right-eye hologram image is formed on an area out of the imaging zone as a virtual image. Accordingly, only the left-eye hologram image formed on the image zone as a virtual image is focused on the left eyeball of the user by the left eyepiece lens 150.

Likewise, in the hologram reflected by the mirror 140 and entering the right eyepiece lens 160, the right-eye hologram image is formed on an imaging zone, which is a focal distance area of the right eyepiece lens 160, as a virtual image, but the left-eye hologram image is formed on an area out of the imaging zone as a virtual image. Accordingly, only the right-eye hologram image formed on the imaging zone as a virtual image is focused on the right eyeball of the user by the right eyepiece lens 160.

An image of a depth that is formed on the imaging zone formed by the left eyepiece lens 150 as a virtual image is the left-eye hologram image, and an image of a depth that is formed on the imaging zone formed by the right eyepiece lens 160 as a virtual image is the right-eye hologram image.

The left-eye hologram image and the right-eye hologram image are different from each other.

To accomplish this, a depth difference between the 'left-eye hologram image' and the 'right-eye hologram image' should be implemented as being the same as a length difference between 'a light path from the SLM 120 to the left eyepiece lens 150' and 'a light path from the SLM 120 to the right eyepiece lens 160'.

When a depth difference between the 'left-eye hologram image' and the 'right-eye hologram image' is implemented as being the same as a distance from the 'beam splitter 130 to the mirror 140', the depth difference may be represented only by a changing light path except for a common light path or a light path of the same length.

Hereinafter, a method for generating a CGH to be applied to a SLM 120 to reconstruct a hologram in which a left-eye hologram image and a right-eye hologram image are represented with a corresponding depth difference will be described in detail.

Figure 5:
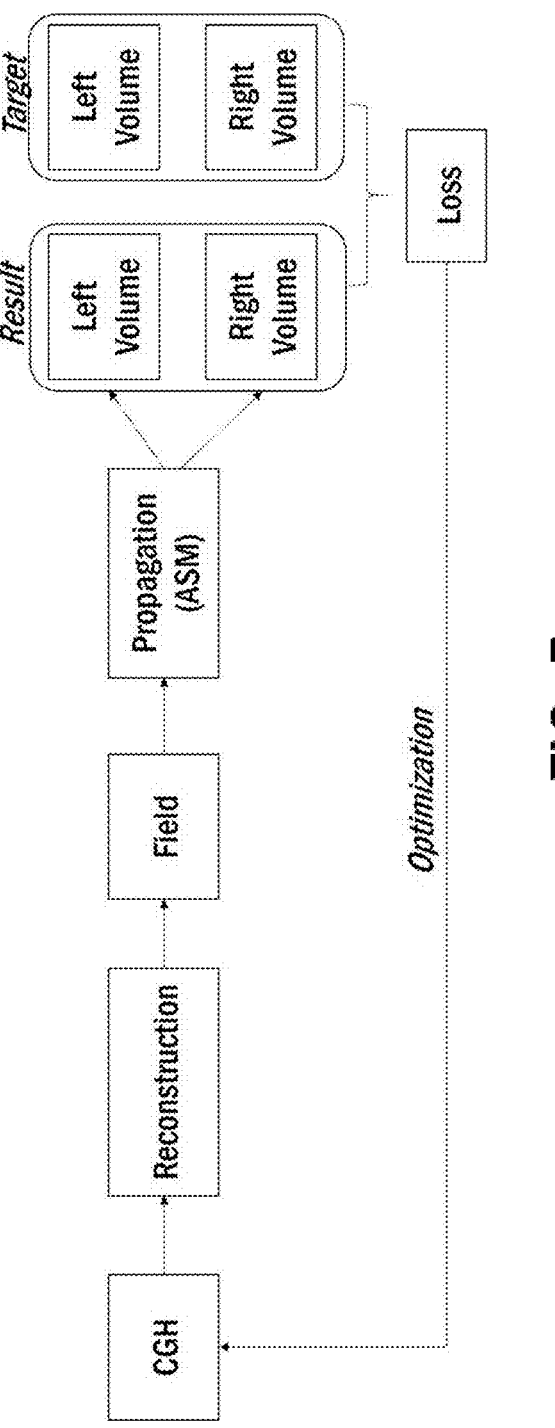
FIG. 5 is a view illustrating an optimization-based single SLM-based binocular CGH generation method.

FIG. 5 is a view illustrating an optimization-based single-SLM-based binocular CGH generation method. This method is for generating an optimal CGH when a binocular 3D image is determined, and performs the following processes:

1) CGH initialization: Initializing a depth of a left-eye hologram image and a depth of a right-eye hologram image in a hologram to a certain random value;

2) Reconstruction: Reconstructing a hologram according to a SLM type (phase-only or amplitude only) and an optical system structure (Fresnel or Fourier holography), a CGH encoding technique (double phase-amplitude coding, side-band coding);

3) Field: Light-field obtained in the CGH through the above-described reconstruction process, which has a complex value;

4) Propagation: Propagating the light-field to sampled depth planes of the left-eye hologram image (3D volume 1) and the right-eye hologram image (3D volume 2) in a free space, wherein light propagation is performed by applying an angular spectrum method (ASM), Fresnel propagation.

5) Loss calculation: Calculating a loss between an appearance of a hologram image obtained for each depth through light-propagation, and a target binocular 3D image, wherein a final loss is calculated by summing all losses for depths in order to obtain an optimized result in all depths, wherein the loss is an L2 loss (mean square error), an L1 loss (mean absolute error), a perceptual loss, or a combination thereof; and 6) Optimization: Updating the CGH based on the loss, wherein a gradient descent-based updating rule is applied.

Figure 6:
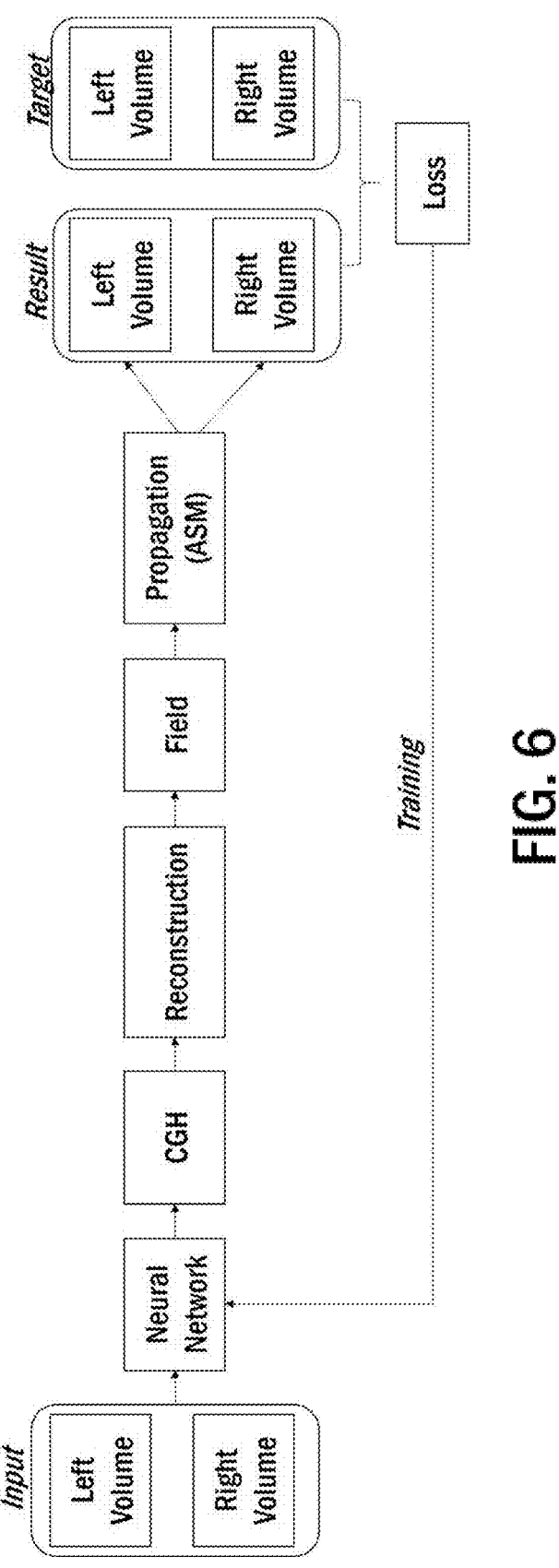
FIG. 6 is a view illustrating a neural network-based single SLM-based binocular CGH generation method.

FIG. 6 is a view illustrating a neural network-based single SLM-based binocular CGH generation method. The method of FIG. 6 differs from the optimization-based CGH generation method of FIG. 5, which optimizes a CGH to be suitable for input left-eye and right-eye images, in that a neural network is designed to change an input to a CGH and is trained based on various training data to have generality. A structure of the neural network may be designed based on a convolutional neural network (CNN).

Figure 7:
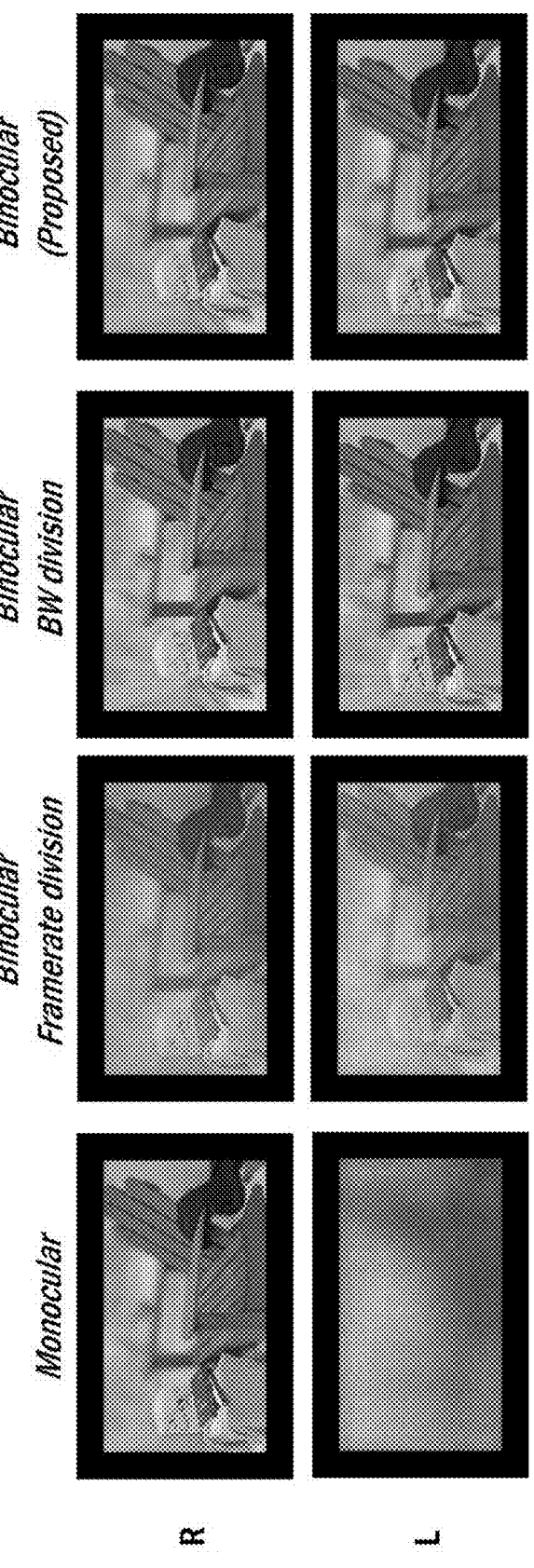
FIG. 7 is a view illustrating a result of performing a hologram reconstruction simulation by applying an optimization-based CGH generation algorithm.

FIG. 7 illustrates results of performing a hologram reconstruction simulation by applying an optimization-based CGH generation algorithm. The leftmost view illustrates a result of optimizing only for the right eyeball. A hologram image of good quality is generated for the optimized right, but there is no image information for the left.

The second and third results are obtained when a left-eye image and a right-eye image of a hologram are optimized while applying framerate division and bandwidth division. When a framerate is divided, a framerate of an entire image is reduced. Even when frame 1 is optimized for a left-eye image and frame 2 is optimized for a right-eye image, both frame 1 and frame 2 are finally observed by a user and a different eyeball image is seen, and thus, image quality is more degraded. When a bandwidth is divided, a binocular image is completely separated and thus there is no additional noise component described above. However, an eyebox and a depth representing capability are reduced. In a distant view of an image where a blur occurs, a blur in the horizontal direction (that is, a depth representing capability) is more reduced than a blur in the vertical direction.

The fourth result is a result according to an embodiment of the disclosure, showing that there are not the problems described above.

Up to now, a single SLM-based binocular holographic near-eye display and a CGH generation method for the same have been described.

In the above-described embodiments, a binocular holographic near-eye display may be implemented with a low-cost/low-form factor without loss of a resolution, an angle of field, a depth representing capability, an eyebox, a frame rate even when the display is implemented by a single SLM, by representing a left-eye hologram image and a right-eye hologram image within a single hologram with different depths, and reconstructing an image by optically separating the left-eye hologram image and the right-eye hologram image.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A near-eye display comprising:
a light source configured to emit light to a modulator;
a modulator configured to modulate light emitted from the light source and to reconstruct a hologram including a first hologram image and a second hologram image;
a splitter configured to split the hologram reconstructed in the modulator and to distribute the hologram to a plurality of paths;

a first eyepiece lens configured to focus only the first hologram image of the split hologram on a first eyeball of a user; and a second eyepiece lens configured to focus only the second hologram image of the split hologram on a second eyeball of the user, wherein the first hologram image is formed on a zone that is out of an imaging zone formed by a focal distance of the second eyepiece lens as a virtual image, and wherein the second hologram image is formed on a zone that is out of an imaging zone formed by a focal distance of the first eyepiece lens as a virtual image.

2. The near-eye display of claim 1, wherein the first hologram image and the second hologram image are represented by hologram images having different depths in the hologram.

3. The near-eye display of claim 2, wherein a depth difference between the first hologram image and the second hologram image is a length difference between a light path from the modulator to the first eyepiece lens and a light path from the modulator to the second eyepiece lens.

4. The near-eye display of claim 1, wherein the splitter is configured to distribute a first part of the hologram to the first eyepiece lens, and to distribute a second part of the hologram to the second eyepiece lens.

5. The near-eye display of claim 4, further comprising a mirror configured to reflect the second part of the hologram split by the splitter to allow the second part of the hologram to enter the second eyepiece lens.

6. The near-eye display of claim 5, wherein a depth difference between the first hologram image and the second hologram image is a distance from the splitter to the mirror.

7. The near-eye display of claim 4, wherein a quantity of light of the first part of the hologram image is the same as a quantity of light of the second part of the hologram image.

8. The near-eye display of claim 1, wherein the first hologram image is one of a left-eye image and a right-eye image, and wherein the second hologram image is an other image of the left-eye image and the right-eye image.

9. A near-eye display method comprising:

emitting, by a light source, light;

modulating, by a modulator, emitted light and reconstructing a hologram including a first hologram image and a second hologram image;

splitting, by a splitter, the reconstructed hologram, and distributing the hologram to a plurality of paths;

focusing, by a first eyepiece lens, only the first hologram image of the split hologram on a first eyeball of a user; and focusing, by a second eyepiece lens, only the second hologram image of the split hologram on a second eyeball of the user, wherein the first hologram image is formed on a zone that is out of an imaging zone formed by a focal distance of the second eyepiece lens as a virtual image, and wherein the second hologram image is formed on a zone that is out of an imaging zone formed by a focal distance of the first eyepiece lens as a virtual image.

10. The method of claim 9, wherein the first hologram image and the second hologram image are represented by hologram images having different depths in the hologram.

11. The method of claim 10, wherein a depth difference between the first hologram image and the second hologram image is a length difference between a light path from the modulator to the first eyepiece lens and a light path from the modulator to the second eyepiece lens.

12. The method of claim 9, further comprising distributing, by the splitter, a first part of the hologram to the first eyepiece lens, and distributing a second part of the hologram to the second eyepiece lens.

13. The method of claim 12, further comprising reflecting, by a mirror, the second part of the hologram split by the splitter to allow the second part of the hologram to enter the second eyepiece lens.

14. The method of claim 13, wherein a depth difference between the first hologram image and the second hologram image is a distance from the splitter to the mirror.

15. The method of claim 12, wherein a quantity of light of the first part of the hologram image is the same as a quantity of light of the second part of the hologram image.

16. The method of claim 9, wherein the first hologram image is one of a left-eye image and a right-eye image, and wherein the second hologram image is an other image of the left-eye image and the right-eye image.

17. A near-eye display comprising:

a light source configured to emit light to a modulator;

a modulator configured to reconstruct a hologram in which a first hologram image and a second hologram image are represented with different depths;

a splitter configured to split the hologram reconstructed in the modulator and to distribute the hologram to a plurality of paths;

a first eyepiece lens configured to focus only the first hologram image of the split hologram on a first eyeball of a user; and a second eyepiece lens configured to focus only the second hologram image of the split hologram on a second eyeball of the user, wherein the first hologram image is formed on a zone that is out of an imaging zone formed by a focal distance of the second eyepiece lens as a virtual image, and wherein the second hologram image is formed on a zone that is out of an imaging zone formed by a focal distance of the first eyepiece lens as a virtual image.

* * * * *